(12) United States Patent
Zuch

(10) Patent No.: US 6,614,868 B1
(45) Date of Patent: Sep. 2, 2003

(54) DEVICE FOR SEALING A TUBE, IN PARTICULAR A LANCE SHAFT

(75) Inventor: Gerhard Zuch, Fuerth (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 09/452,700

(22) Filed: Dec. 2, 1999

(30) Foreign Application Priority Data

Dec. 2, 1998 (DE) .......................... 198 55 672

(51) Int. Cl.⁷ .................... G21C 13/028; G21C 13/067
(52) U.S. Cl. .................. 376/203; 376/204; 376/205
(58) Field of Search .................. 376/204, 205, 376/200, 203

(56) References Cited

U.S. PATENT DOCUMENTS

| 4,563,326 A | * | 1/1986 | Ullrich et al. ............... 376/292 |
| 4,624,824 A | * | 11/1986 | Dooley ...................... 376/204 |
| 4,655,483 A | * | 4/1987 | Margotta .................... 285/169 |
| 5,348,354 A | * | 9/1994 | Badoureaux ................ 285/308 |
| 5,619,546 A | | 4/1997 | Porter et al. |
| 5,631,936 A | * | 5/1997 | Theroux et al. ............ 376/204 |
| 6,158,371 A | * | 12/2000 | De Risi ....................... 114/151 |

FOREIGN PATENT DOCUMENTS

| DE | 7910840 | 5/1980 |
| DE | 3220610 A1 | 12/1983 |
| JP | 360210332 A | * 10/1985 |
| JP | 02000005301 A | * 1/2000 |

* cited by examiner

Primary Examiner—Peter M. Poon
Assistant Examiner—Jeffrey L. Gellner
(74) Attorney, Agent, or Firm—Laurence A. Greenberg; Werner H. Stemer; Ralph E. Locher

(57) ABSTRACT

A device for sealing a tube in an opening which is located in a component. The tube is in particular a lance shaft and the component is in particular a nozzle connected to a cover of a reactor pressure vessel. A pressure element is in operative connection with the tube. As a result, the tube is pressed against the component. Provision is made for the pressure element to be driven hydraulically.

4 Claims, 3 Drawing Sheets

DEVICE FOR SEALING A TUBE, IN PARTICULAR A LANCE SHAFT

BACKGROUND OF THE INVENTION

Field of the Invention

The invention relates to a device for sealing a tube, in particular a lance shaft, in an opening which is located in a component, in particular in a nozzle connected to a cover of a reactor pressure vessel, a pressure element being in operative connection with the tube for pressing the tube against the component.

For various applications, it is conventional practice to connect a tube to a component in a liquid-tight manner or even in a gas-tight manner, the component being part of a vessel. Such a vessel may be the reactor pressure vessel of a nuclear power station, and the component may be a nozzle that is connected to the cover of the reactor pressure vessel. The tube may be a lance shaft, through which, for example, measuring probes or cables may be passed. Especially when used in a nuclear power station, it is necessary for the tube, in particular the lance shaft, to be tightly connected to the component.

On the other hand, during an inspection in the nuclear power station, it is necessary for the tight connection between the lance shaft and the cover nozzle to be opened and to be closed again after a thorough examination. Proper closure requires the action of the pressure element to be checked.

It has hitherto been conventional practice to use pressing screws as pressure elements, the fitting of which pressing screws is complicated and can only be carried out by personnel. In order to check a pressure element, mechanical caliper gauges had to be used manually, which in a nuclear power station requires the use of personnel with protective clothing and is time-consuming.

SUMMARY OF THE INVENTION

It is accordingly an object of the invention to provide a device for sealing a tube, in particular a lance shaft which overcomes the above-mentioned disadvantages of the prior art devices of this general type, which device, in particular during a check, does not need the use of personnel or only needs the use of minimum personnel at the seal itself and nonetheless can be manipulated quickly and reliably.

With the foregoing and other objects in view there is provided, in accordance with the invention, a device for sealing a tube in an opening located in a component, including a hydraulically driven pressure element being in operative connection with the tube for pressing the tube against the component. In particular, the tube can be a lance shaft in a nozzle connected to a cover of a reactor pressure vessel.

This object is achieved according to the invention in that the pressure element can be driven hydraulically.

This achieves the advantage that the pressure element can be moved in a remote-controlled manner. By a hydraulic medium that is fed via a pipeline and is a liquid as a rule, the pressure element is moved without a person having to work directly at the pressure element.

The pressure element contains, for example, a disk spring, which is disposed between the component and a pressure part producing a force. This pressure part may be a hydraulic cylinder. The disk spring produces a preloading force, which helps to form a tight connection.

If, after an inspection, the tube, in particular the lance shaft, has been disposed again in the component, in particular in the nozzle of the cover of the reactor pressure vessel, the preloading force of the disk spring also has to be reset and checked. With the device according to the invention, this may advantageously be done hydraulically and thus in a remote-controlled manner via a hydraulic line.

To measure the preloading force of the disk spring, a pressure gauge is connected, for example, to a hydraulic line of the pressure element. The pressure measured there of the medium in the hydraulic line allows the preloading force of the disk spring to be inferred directly. The preloading force can be varied by simple adaptation of the pressure, for example by a pump.

The invention achieves in particular the advantage that the sealing and even, if need be, the checking and setting of a preloading force of the disk springs can be effected quickly and reliably via a hydraulic line. Advantageously, it is not necessary to use personnel with substantial protective clothing directly at the component, which may be part of a reactor pressure vessel of a nuclear power station.

Other features which are considered as characteristic for the invention are set forth in the appended claims.

Although the invention is illustrated and described herein as embodied in a device for sealing a tube, in particular a lance shaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when.read in connection with the accompanying drawings.

DESCRIPTION OF THE PREFERRED EMBODIMENTS

Figure 1:
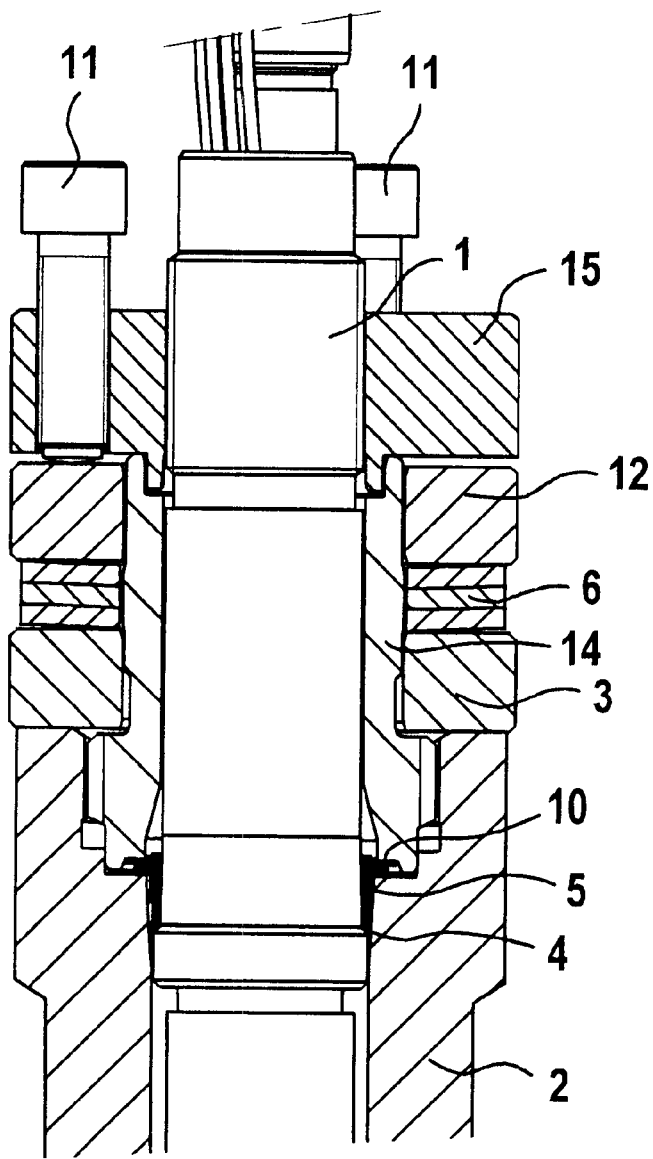
FIG. 1 is a diagrammatic, sectional view of a device regarded as prior art for sealing a tube in an opening.
Figure 2:
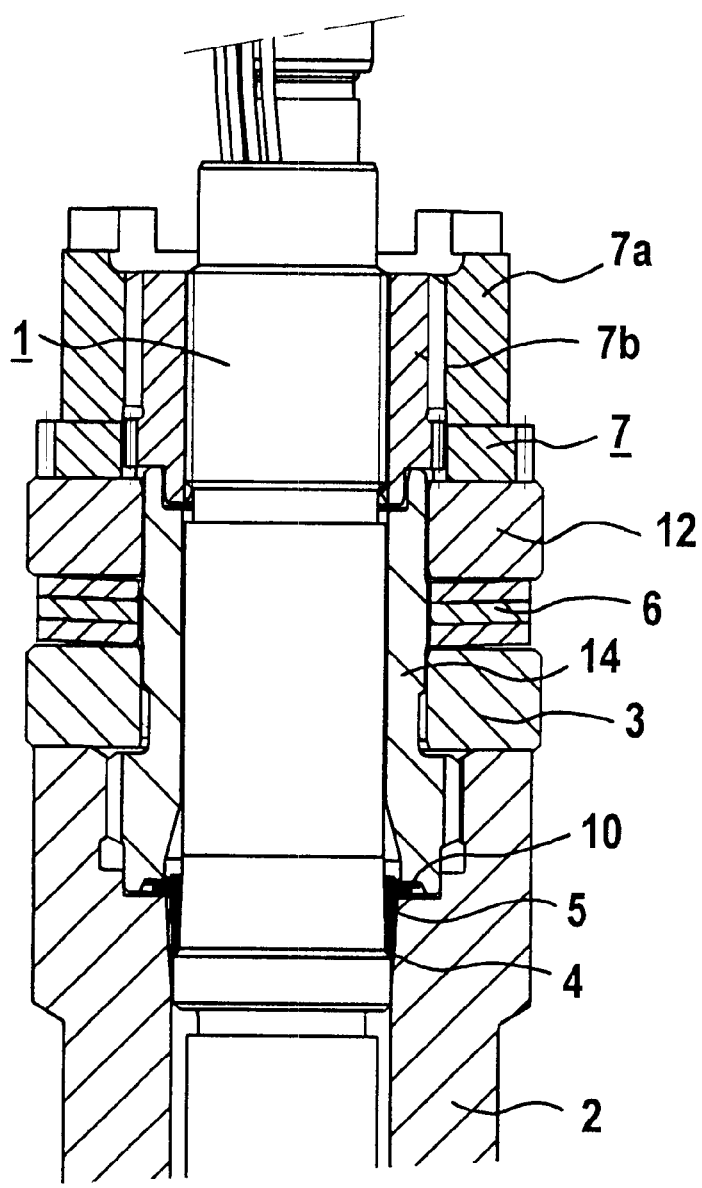
FIG. 2 is a sectional view of the device serving the same purpose as the device in FIG. 1 but according to the invention.

In all the figures of the drawing, sub-features and integral parts that correspond to one another bear the same reference symbol in each case. Referring now to the figures of the drawing in detail and first, particularly, to FIGS. 1 and 2 thereof, there is shown a lance shaft 1 which is in the form of a tube. Measuring lances that carry sensors may be disposed in the lance shaft 1. The sensors determine the state inside a reactor pressure vessel. The lance shaft 1 is inserted into the reactor pressure vessel from outside in a pressure-tight manner. To this end, it is guided in a nozzle 2 of a cover of the reactor pressure vessel and is sealed off from the nozzle 2.

The sealing is ensured by pressing a sealing ring 5 via an integrally formed portion 4 on the lance shaft 1 into a seat 10 on a threaded socket 14 connected to the nozzle 2, in the course of which the sealing ring 5 is likewise pressed against the nozzle 2. For pressing the sealing ring 5 into place, a force is exerted on a pressing plate 3 which bears against the nozzle 2, a factor which leads to an opposed force being exerted on the lance shaft 1 by a mechanical force transmission, and this force presses the integrally formed portion 4 of the lance shaft 1 against the seat 10.

In the known device (FIG. 1), the force on the pressing plate 3 is produced via pressing screws 11. For the mechanical force transmission to the lance shaft 1 there is a plate 15, which is firmly connected to the lance shaft 1 and has threads for accommodating the pressing screws 11. When the pressing screws 11 are screwed in, the plate 15 and thus also the lance shaft 1 are lifted. The combination of the pressing screw 11 and the plate 15 constitutes the basic form of a pressure element.

The pressing screws 11 do not act directly on the pressing plate 3 but on an additional pressing plate 12, one or more disk springs 6 being located between the pressing plate 3 and the additional pressing plate 12. The disk springs 6 ensure a preloading force, which is supplemented by the force of the pressing screws 11. The pressure element may consist of the pressing screw 11, the plate 15 and the disk springs 6. The preloading force of the disk springs 6 must be reset after every inspection, a factor which necessitates additional work on the device, and this additional work must be carried out with protective precautions taken.

The device according to the invention (FIG. 2) correspondingly has the additional pressing plate 12 and one or more of the disk springs 6 which are disposed in the same way. The difference from the known device consists in the fact that pressure parts 7 that are hydraulically actuated take the place of the pressing screws 11. The pressure parts 7 may be, for example, so-called HYTORC nuts. The pressure part 7 alone constitutes the basic form of a pressure element. The pressure part 7 and the disk springs 6 may then together form the pressure element, the pressure part 7 producing a force and the disk springs 6 producing a preloading force (preloading). For the mechanical force transmission from the pressure part 7 to the lance shaft 1, the pressure part 7 has two parts moving in opposite directions. If the outer part 7a is moved downward, the inner part 7b is lifted and takes the lance shaft 1 with it, since it is firmly connected to it.

Figure 3:
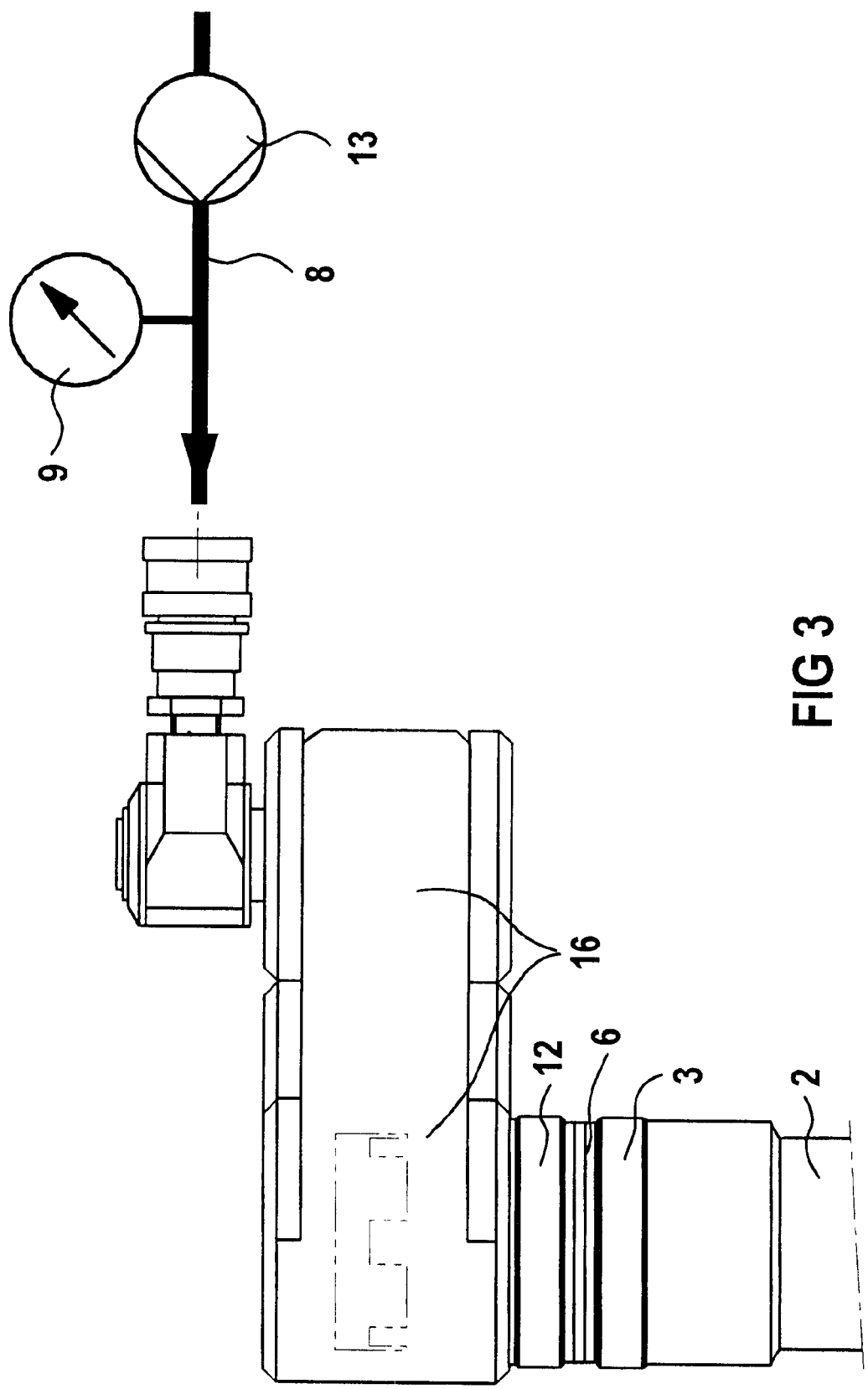
FIG. 3 is a side-elevational view of a hydraulic tool which drives the device of FIG. 2.

For driving the pressure parts 7 there is provided a hydraulic tool 16 (FIG. 3), which is connected to a hydraulic line 8, in which a pump 13 for the hydraulic medium is fitted. A pressure gauge 9 is connected to the hydraulic line 8. The pressure gauge 9 measures the pressure of the hydraulic medium, which enables the instantaneous preloading force of the disk springs 6 to be inferred. The preloading force of the disk springs 6 can be set by varying the pressure by the pump 13. The hydraulic tool 16 covers or surrounds the top part of the lance shaft 1 and the entire pressure part 7 and rests on the additional pressing plate 12, which, configured as a ring, surrounds the lance shaft 1 shown in FIG. 2. The lance shaft 1 extends inside the tubular nozzle 2, a factor which cannot be seen in FIG. 3, and if need be also inside the pressing plate 3, the disk springs 6 and the additional pressing plate 12, all of which surround the lance shaft 1 in an annular manner. The hydraulic tool 16 (FIG. 3) may have an opening through which the lance shaft 1 can pass upward.

With the device according to the invention, on the one hand sealing of the lance shaft 1 in the nozzle 2 can be effected quickly and reliably in a remote-controlled manner solely via the hydraulic line 8 and with the pump 13, and in addition the preloading force of the disk springs 6 can be monitored by the pressure gauge 9 and can be varied or set by the pump 13. Advantageously, it is not necessary for personnel in protective suits to work directly at the leadthrough.

I claim:

1. A device for sealing a tube in an opening located in a component, comprising:

a hydraulically driven pressure element being in operative connection with the tube for pressing the tube against the component, said pressure element producing a contact pressure power between the tube and the component, and said contact pressure power containing a hydraulic power factor, said pressure element having a pressure part producing a force and a disk spring producing a preloading force, said disk spring disposed between said pressure part and the component.

2. The device according to claim 1, including:

a hydraulic line connected to said hydraulically driven pressure element; and a pressure gauge connected to said hydraulic line for measuring the preloading force of said disk spring.

3. A device for sealing a lance shaft in a nozzle connected to a cover of a reactor pressure vessel, comprising:

a hydraulically driven pressure element being in operative connection with the lance shaft for pressing the lance shaft against the cover of the reactor pressure vessel, said pressure element producing a contact pressure power between the lance shaft and the cover of the reactor pressure vessel, and said contact pressure power containing a hydraulic power factor, said pressure element having a pressure part producing a force and a disk spring producing a preloading force, said disk spring disposed between said pressure part and the cover of the reactor pressure vessel.

4. The device according to claim 3, including:

a hydraulic line connected to said hydraulically driven pressure element; and a pressure gauge connected to said hydraulic line for measuring the preloading force of said disk spring.

* * * * *